(12) United States Patent
Nagarkar et al.

(10) Patent No.: US 10,620,323 B1
(45) Date of Patent: Apr. 14, 2020

(54) PHOTONIC BAND GAP SCINTILLATOR STRUCTURES

(71) Applicants: Vivek V. Nagarkar, Weston, MA (US); Bipin Singh, Chelmsford, MA (US)

(72) Inventors: Vivek V. Nagarkar, Weston, MA (US); Bipin Singh, Chelmsford, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 599 days.

(21) Appl. No.: 13/657,671

(22) Filed: Oct. 22, 2012

Related U.S. Application Data

(60) Provisional application No. 61/550,189, filed on Oct. 21, 2011.

(51) Int. Cl.
  *G01T 1/20* (2006.01)
  *G01T 1/202* (2006.01)
  *B82Y 20/00* (2011.01)

(52) U.S. Cl.
  CPC .......... *G01T 1/2002* (2013.01); *G01T 1/2023* (2013.01); *B82Y 20/00* (2013.01); *G01T 1/202* (2013.01)

(58) Field of Classification Search
  CPC ........ B82Y 2/00; G02B 6/1225; G01T 1/2023
  USPC ............................................. 250/367, 370.11
  See application file for complete search history.

(56) References Cited

U.S. PATENT DOCUMENTS

| | | | |
|---|---|---|---|
| 7,361,901 B1 | 4/2008 | Gaysinskiy | |
| 7,372,041 B1 | 5/2008 | Nagarkar et al. | |
| 7,612,342 B1 | 11/2009 | Nagarkar | |
| 7,723,687 B2 | 5/2010 | Nagarkar et al. | |
| 7,854,961 B1 | 12/2010 | Brecher et al. | |
| 2005/0104000 A1* | 5/2005 | Kindem | G01T 1/1644 250/361 R |
| 2006/0131509 A1* | 6/2006 | Matz | G01T 1/2018 250/370.11 |
| 2006/0202125 A1* | 9/2006 | Suhami | B82Y 20/00 250/368 |
| 2012/0201346 A1* | 8/2012 | Cao | G01T 1/2002 378/53 |
| 2014/0110591 A1* | 4/2014 | Reboud | G01T 1/2002 250/366 |

OTHER PUBLICATIONS

"Improving Light Extraction From Heavy Inorganic Scintillators by Photonic Crystals", IEEE Transactions on Nuclear Science, vol. 57, No. 5, Oct. 14, 2010 to Kronberger et al.*
"Design of a one-dimensional photonic crystal for the modification of BaF2 Scintillation Spectrum", Nuclear Instruments and Methods in Physics Research, (2003), 129-137 to Wu et al.*
"Liquid crystal modified photonic crystal fiber (LC-PCF) fabricated with an un-cured SU-8 photoresist sealing technique for electrical flux measurement", pp. 18372-18370, Optics Express, vol. 19, No. 19, Sep. 2011, to Kuo et al.*

(Continued)

*Primary Examiner* — Kenneth J Malkowski
(74) *Attorney, Agent, or Firm* — Wilson Sonsini Goodrich & Rosati

(57) ABSTRACT

Photonic band gap structures and related systems, devices and methods are provided.

15 Claims, 11 Drawing Sheets

(56) References Cited

OTHER PUBLICATIONS

"Fabrication of three-dimensional polymer photonic crystal structures using single diffraction element interference lithography" Applied Physics Letters 82, 1667 (2003) to Mayer et al.*

Knapitsch, et al. Photonic crystals: A novel approach to enhance the light output of scintillation based detectors. Nuclear Instruments and Methods in Physics Research Section A. 2011; vol. 628, Issue 1, p. 385-388. (Preprint submitted to Nuclear Instruments and Methods in Physics Research Section A. Jun. 11, 2010).

Bhandari, et al. Hot Wall Evaporation of High-Sensitivity, High-Resolution CeBr3 Scintillator. IEEE Trans. Nucl. Sci., vol. 59, No. 5, Oct. (2012).

Camfr website. http://camfr.sourceforge.net/. Accessed Nov. 26, 2014.

Chang, et al. Assembling nanoparticle catalysts with nanospheres for periodic carbon nanotube structure growth. Nanotechnology 22(3):035301, Jan. 2011.

Chang, et al. Design and optimization of broadband antireflection structures for diffractive optics. Optics Letters 35(7):907-909, Apr. 2010.

Chang, et al. From two-dimensional colloidal self-assembly to three-dimensional nanolithography. Nano Letters 11(6):2533-2537, Jun. 2011.

Chang, et al. Nanostructured gradient-index antireflection diffractive optics. Opt. Lett. 36(12):2354-2356, Jun. 2011.

Gao, et al. Design of thin-film photonic metamaterial Luneburg lens using analytical approach. Opt. Express 20(2):1617-1628, Jan. 2012.

Gao, et al. Photonic cloak made of subwavelength dielectric elliptical rod arrays. Opt. Commun. 284(19):4820-4823, Sep. 2011.

Garderner, et al. A novel route for the inclusion of metal dopants in silicon. Nanotechnology (2010) 21, 025304.

Garderner, et al. Oxide nanoparticle thin films created using molecular templates. (2011) J. Phys. Chem. C, 115, 13151.

Gaysinskiy, et al. Luminescence properties and morphology of ZnSe:Te Films. IEEE Trans. Nucl. Sci., 55(3), pp. 1556-1560, (2008).

Gentit, F.X. Litrani: a general purpose Monte-Carlo program simulating light propagation in isotropic or anisotropic media, Nucl. Instr. Meth. A, vol. 486, pp. 35, 2002.

Gundacker, et al. A Systematic Study to Optimize SiPM Photo-Detectors for Highest Time Resolution in PET. IEEE Trans. Nucl. Sci. 59 (2012) 1798-1804.

Guss, et al. Lanthanum halide nanoparticle scintillators for nuclear radiation detection, J. Appl. Phys. 113, 064303 (2013); doi: 10.1063/1.4790867.

Heutz, et al. Molecular thin films: a new type of magnetic switch. (2007) Adv. Mater. 19, 3618.

Kang, et al. CdTe quantum dots and polymer nanocomposites for x-ray scintillation and imaging, Appl Phys Lett. May 2, 2011; 98(18):181914. Epub May 6, 2011.

Kappers, et al. Concentration Dependence of Afterglow Suppression in CsI:Tl,Sm. 2010 J. Phys.: Conf. Ser. 249 012014 doi:10.1088/1742-6596/249/1/012014.

Knapitsch, et al. Photonic crystals: A novel approach to enhance the light output of scintillation based detectors. NIM A 628 (2011) 385-388.

Kronberger, et al. Determination of the Absolute Light Yields of LuYAP and LYSO. IEEE Nucl. Sci. Symp. Med. Imag. Conf. 2008, Poster N02-353, Dresden, 2008.

Kronberger, et al. Improving Light Extraction from Heavy Inorganic Scintillators by Photonic Crystals, IEEE NSS/MIC, 2008, Conf. Recd., pp. 3914-3919.

Lawrence, et al. Quantum Dot-Organic Polymer Composite Materials for Radiation Detection and Imaging, IEEE TNS, vol. 59, Issue 1, pp. 215-221, (2012).

Lecoq, et al. Factors Influencing Time Resolution of Scintillators and Ways to Improve Them. IEEE Trans. Nucl. Sci., 57(5), Part: 1, pp. 2411-2416 (2010).

Lecoq, P. New Approaches to Improve Timing Resolution in Scintillators. IEEE Trans. Nucl. Sci., 59(5), Part: 2, pp. 2313-2318 (2012).

Mavromanolaki, et al. Studies on sampling and homogeneous dual readout calorimetry with meta-crystals. J. Instrum. 6 (2011) P10012.

Mont, et al. High-refractive-index TiO2-nanoparticle-loaded encapsulants for light-emitting diodes. J. Appl. Phys., (2008) 103 (8): 83120. Bibcode:2008JAP . . . 103h3120M. doi:10.1063/1.2903484.

Nagarkar, et al. Bright semiconductor scintillator for high resolution X-ray imaging. IEEE Trans. Nucl. Sci., 57(3), p. 923-930 (2010).

Nagarkar, et al. Growth and Characterization of Polycrystalline Lanthanide Halide Scintillators. Nucl. Inst. & Meth. A, 652, pp. 271-274, 2011.

NIST nanostructure fabrication processes website. /http://www.nist.gov/mml/msed/thin_film_nanostructure/nanostructure-fabrication-processes.cfm. Accessed Nov. 26, 2014.

NIST Physical Measurement Laboratory website. http://www.nist.gov/pml/data/xray_gammaray.cfm. Accessed Nov. 26, 2014.

Ovechkina, et al. Effect of Tl+ and Sm2+ Concentrations on Afterglow Suppression in CsI:Tl, Sm Crystals. IEEE Tran. Nucl. Sci. vol. 59, No. 5, Oct. 2012.

Park, et al. Nanotextured silica surfaces with robust superhydrophobicity and omnidirectional broadband supertransmissivity. ACS Nano, 6(5), pp. 3789-3799 (2012).

Pauwels, et al. Effect of Aspect Ratio on the Light Output of Scintillators, IEEE Trans. Nucl. Sci. 59(5),Part2, 2012 , pp. 2340-2345.

Seto, et al. Synthesis and property of 9,9-spirobifluorene-containing aromatic polyesters as optical polymers with high refractive index and low birefringence. Polymer, (2010) 51 (21): 4744. doi:10.1016/j.polymer.2010.08.032.

Singh, et al. Photonic Crystal Structures for Improved Scintillator Performance, submitted to 2013 IEEE NSS/MIC, Seoul, Korea.

Takahashi, et al. Adiabatic focusing of light in subwavelength high-index contrast dielectrics. International Journal of Nanomanufacturing 6(1-4):245-252, 2010.

Thacker, et al. Low-afterglow CsI:Tl microcolumnar films for small animal high-speed microCT. Nucl. Inst. & Meth. A 604, Issues 1-2, 89-92 (2009).

Tian, et al. Localized propagation modes guided by shear discontinuities in photonic crystals. Optics Express 14:10887-10897, 2006.

Wang, et al. Ultralong copper phthalocyanine nanowires with new crystal structure and broad optical absorption. (2010) ACS Nano 4, 3921.

Xu, et al. Compact optical waveguide coupler using homogeneous uniaxial medium. J. Opt. Soc. Am. B 28(11):2633-2636, Nov. 2011.

Yen, et al. A facile approach towards optically isotropic, colorless, and thermoplastic polyimidothioethers with high refractive index. J. Mater. Chem., (2010) 20 (20): 4080. doi:10.1039/c000087f.

* cited by examiner

PHOTONIC BAND GAP SCINTILLATOR STRUCTURES

CROSS-REFERENCE

This application claims the benefit of U.S. Provisional Application No. 61/550,189 filed Oct. 21, 2011, which is incorporated herein by reference.

STATEMENT AS TO FEDERALLY SPONSORED RESEARCH

This invention was made with the support of the United States government under Contract number 1R43EB012386-01 by National Institute of Biomedical Imaging and Bioengineering.

BACKGROUND OF THE INVENTION

The present disclosure provides photonic band gap structures and related systems, devices and methods.

Research in instrumentation for molecular imaging continues to look towards developing scanners with improved sensitivity and temporal resolution, thereby improving the 3D spatial localization of activity distributions within patients and improving quantitation in functional imaging tasks. Several new scintillation materials with high brightness, such as LSO, LYSO, and $LaBr_3$:Ce, have recently been developed to improve scanners, but there is still a need to improve the overall performance of current detectors for, e.g., providing scanners with significantly improved properties.

Current detector configurations use scintillator coupling techniques that are inefficient in collecting the scintillation light to be used in the detection process. For example, far finer timing resolution (significantly better than that currently implemented in the field) could be achieved for PET, allowing the use of time-of-flight (TOF) measurements to offset depth-of-interaction blurring effects, and enhanced light output could be used to facilitate further improvements in energy resolution, thereby improving sensitivity.

Thus, there is a need for improved devices and methods for increasing light transfer efficiency to the photodetector, e.g., leading to an improvement in the temporal resolution, spatial resolution, and/or energy resolution of a detector.

SUMMARY OF THE INVENTION

The present disclosure provides photonic band gap structures and related systems, devices and methods. More specifically, the present disclosure provides photonic crystals for improving light extraction from scintillators.

In some aspects, the present invention includes a nonconducting layered structure including a photonic band gap structure formed on a scintillator. The present invention includes a radiation detection device including a photosensor coupled to a nonconducting layered structure that includes a photonic band gap structure. The nonconducting layered structure can be formed on a surface of the scintillator.

In another aspect, the present invention includes a method of making a photonic band gap structure formed on a scintillator. The method can include forming a dielectric layer on a scintillator, wherein the dielectric layer is formed directly on the scintillator or on a nonconducting, transparent dielectric support layer on the scintillator. The method can also include removing regions of the dielectric layer to form a photonic band gap structure on the scintillator.

In another aspect, the present invention includes a method of making a photonic band gap structure formed on a tape material. The method can include forming a dielectric layer on a tape material, wherein the dielectric layer is formed directly on the tape material or on a nonconducting, transparent dielectric support layer on the tape material. The method can also include removing regions of the dielectric layer to form a photonic band gap structure on the tape material and adhering the tape material to a scintillator.

For a fuller understanding of the nature and advantages of the present disclosure, reference should be made to the ensuing detailed description taken in conjunction with accompanying drawings/figures. The drawings/figures represent embodiments of the present disclosure by way of illustration. The disclosed embodiments are capable of modification in various respects without departing from the invention. Accordingly, the drawings/figures and description of these embodiments are illustrative in nature, and not restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION OF THE INVENTION

Figure 1:
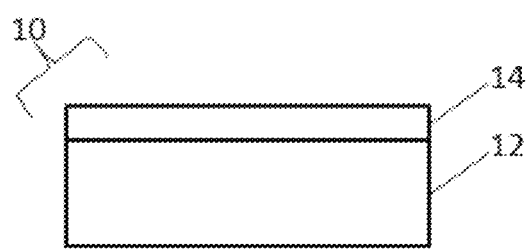
FIG. 1 depicts an example architecture of a nonconducting layered structure that can be coupled with a scintillator, in accordance with an embodiment of the present invention.

The present disclosure provides photonic band gap structures and related systems, devices and methods. More specifically, the present disclosure provides photonic crystals for improving light extraction from scintillators.

In one aspect, the present disclosure describes application of photonic crystals to the surfaces of scintillators to increase the light collection efficiency of detectors employing such assemblies. Using suitable means, photonic crystal patterns may be incorporated directly into the surfaces of scintillator crystals, further improving their light collection efficiency.

Photonic crystals (PCs) are useful optical materials for controlling and manipulating light. The photonic crystals are also referred to herein as photonic band gap (PBG) structures. The photonic crystals or photonic band gap structures described herein are generally structured in a dielectric material so as to interact and manipulate light emitted from a scintillator. For example, photonic crystals can create an environment for quantum mechanical light-matter interaction that can be used in micro- and nano-photonics devices. Using different materials (e.g., with different dielectric constants) and by adjusting geometric parameters, the propagation of light can be modified in a controlled manner. In some embodiments, the present invention involves the use of photonic crystals, e.g., to improve the temporal, spatial and/or energy resolution of photodetectors (e.g., PET detectors).

Certain aspects of the present invention involve new methods that allow for the photonic band gap structures to be, e.g., directly deposited on a scintillator surface or on a nonconductive support layer for a layer having the photonic band gap structure. The photonic band gap structure can be formed in any suitable dielectric material (e.g., silicon nitride). It also noted that a photonic band gap structure and a photonic crystal are used interchangeably herein. The present invention in-part is based on the development of a method of using an anti-charging layer (e.g., a conductive photoresist layer) in fabricating the photonic band gap structures. In contrast to other methods, use of an anti-charging layer removes a need to use a conductive layer (e.g., ITO) in between the photonic band gap structure and the scintillator. By not requiring such a conductive layer, the present invention provides several non-limiting advantages and flexibility. For example, using a an anti-charging layer allows for making a layered structure in which the photonic band gap structure is directly on the scintillator without a layer in between. Moreover, nonconductive support layers can be used in between the photonic band gap structure and the scintillator such that the index of refraction of the support layer can be selected according to the index of refraction of the particular scintillator material being used.

The present invention includes arrangements of a nonconducting layered structure and a scintillator. The arrangements of the present invention include the photonic band gap structures. As will be described further herein, the nonconducting layered structure and a scintillator can be coupled with a photosensor to prepare a radiation detection device.

Figure 2:
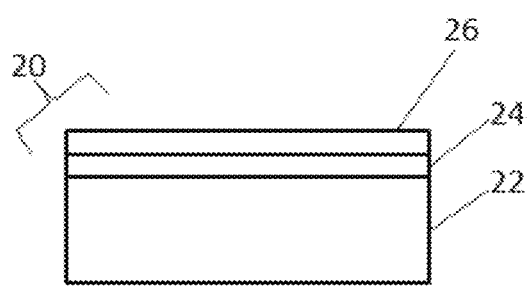
FIG. 2 shows an example architecture of a nonconducting layered structure including a support layer and a layer including a photonic band gap structure that can be coupled with a scintillator, in accordance with an embodiment of the present invention.

FIG. 1 shows an example arrangement 10 that includes a scintillator 12 coupled to a nonconducting layered structure 14. In some embodiments, the nonconducting layered structure can include one or more layers, in which at least one layer includes a photonic band gap structure. As shown in FIG. 2, the example arrangement 20 includes a layer including a photonic band gap structure 26 on a support layer 24 (e.g., a transparent dielectric support layer). The support layer 24 is on a scintillator 22. In some embodiments, a layer including a photonic band gap structure can be directly formed on the surface of the scintillator without a support layer in between.

Figure 3A:
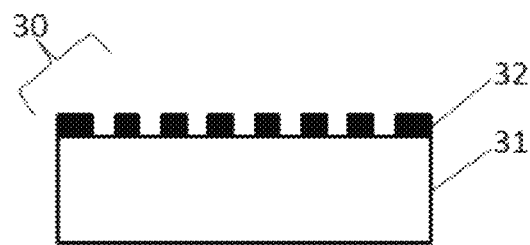
FIGS. 3A-3C illustrates example nonconducting layered structures on a scintillator, in accordance with embodiments of the present invention.

The nonconducting layered structure of the present invention includes any dielectric material that can be used, e.g., to make photonic crystals and/or serve as a support layer for a photonic crystal layer (i.e., a layer including a photonic band structure). In some embodiments, the nonconducting layered structure includes a transparent dielectric material. As shown further in FIGS. 3A-3C, the nonconducting layered structures can include the photonic band gap structures in a variety of arrangements. For example, FIG. 3A illustrates an arrangement 30 in which a photonic band gap structure 32 is formed directly on a scintillator 31. In another embodiment, the arrangement 33 can include a photonic band gap structure 36 formed on a nonconducting support layer 35 that is coupled to a scintillator 34. In yet another embodiment, an arrangement 37 can include a coating layer 40 on a photonic band gap structure 39, which is directly formed on a scintillator 38.

Figure 3B:
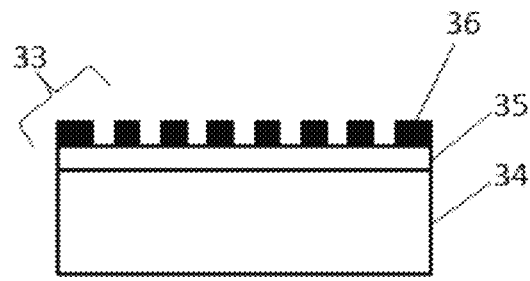
Figure 3C:
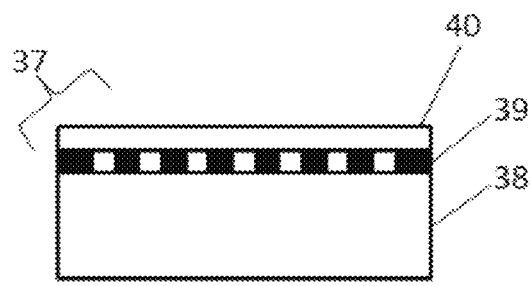

Many other variations of the arrangement of the nonconducting layered structure and the scintillator can be envisioned. For example, additional layers can be added in the nonconducting layered structure. In addition, the scintillator may be coupled to a substrate (e.g., an optically transparent substrate or a reflective substrate). Referring to FIG. 3B, the photonic band gap structure may be formed in both the first layer 36 and in the support layer 35 such that the removed regions span throughout the thickness or partially through the thickness of the support layer 35. In some embodiments, the photonic band gap structure may be integrated into the scintillator (e.g., by etching structures into the scintillator surface).

The layers in the nonconducting layered structure can have a variety of desired thicknesses. For example, the layer(s) including the photonic band gap structure can be on the order of tens to hundreds of nanometers, and in some instances microns. A support layer can also be on the order of tens to hundreds of nanometers, and in some instances tens of microns to a few hundred microns. In some embodiments, the photonic band gap structure can be formed in a silicon nitride layer having a thickness ranging from about 100 nm to about 900 nm. In certain embodiments, the support layer can be formed in a sapphire ($Al_2O_3$) layer having a thickness ranging from about 100 nm to about 900 nm.

In addition to thickness, the nonconducting layered structure can be formed on a scintillator over a wide variety of areas. In particular, due in part to the methods described herein, the present invention includes wide area photonic band gap structures that can be advantageous, e.g., in a wide variety of applications, such as those that involve use of large area (e.g., $cm^2$) scintillators. In some embodiments, the photonic band gap structures can cover a scintillator over areas on the order of square millimeters or square centimeters. In certain embodiments, the photonic band gap structure can be formed over an area of the scintillator greater than about 1 square millimeter, greater than about 4 square millimeters, or greater than about 9 square millimeters. In some embodiments, the photonic band gap structure can be formed over an area of the scintillator between about 1 square millimeter and 9 square millimeters. The photonic band gap structures can be formed over large areas using deposition techniques described herein. In one embodiment, the large area photonic band gap structures can be formed using imprinting techniques (e.g., hard and soft imprinting lithography) that involve patterning the photonic crystals on the surface of the scintillator or other layer in a sequential fashion, e.g., by imprinting one area and then imprinting an adjacent area.

To function as a photonic crystal, the structures described herein can include a periodicity designed to direct light, e.g., light emitted from the scintillator. For example, the photonic band gap structures can have a variety of periodic structures, such as pillars or columns that extend away from a surface of an adjacent layer, e.g., a surface of the scintillator. Alternatively, holes can be removed from a layer in the nonconductive layered structure so as to form the photonic band gap structure. The pillars or holes can have a variety of profiles, such as a circle, square, rectangle, or triangle. In some embodiments, the periodic structures have the same shape (e.g., all circle-shaped holes). In other embodiments, the periodic structures may have different shapes (e.g., some are circle-shaped holes and some are square-shaped holes). Alternatively, one region of the photonic band gap structure may include pillars and another region may include holes. As will be described further herein, selection of forming a photonic band gap structure as pillars and/or holes can depend on the method chosen for making the structure and the application of use for the structure. For example, in some embodiments, the photonic band gap structures can be formed to provide a reflective or transmissive surface for a desired wavelength.

Figure 4:
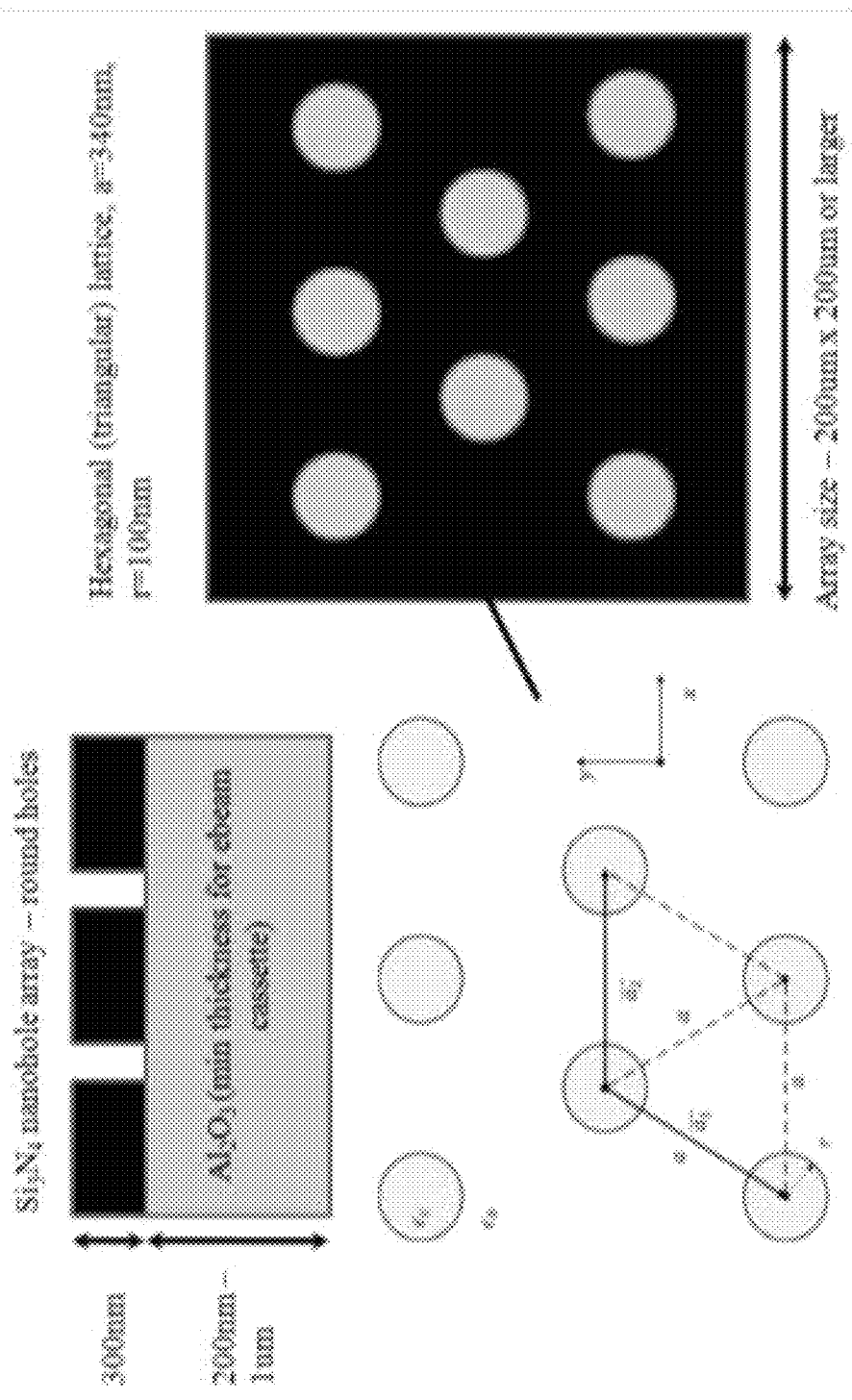
FIG. 4 illustrates an example photonic band gap structure having hexagonal periodicity, in accordance with an embodiment of the present invention.

The periodicity of the photonic band structure can be tailored according to a particular application. For example, periodicity may be selected to produce a reflective surface or a transmissive surface for a desired wavelength. In some embodiments, the pillars and/or holes can be arranged in an array having, e.g., a triangular, square or hexagonal periodicity defined by a particular lattice constant. Superlattice photonic crystal structures can also be used. In addition, to tailoring periodicity, the hole or pillar size (e.g., diameter) can be modified for a particular application. FIG. 4 shows one example of a photonic band gap structure of a nanohole array of round holes in $Si_3N_4$ on a sapphire support layer. A thin film of $Si_3N_4$ was deposited on a thin sapphire substrate that was placed on a scintillator. By making the sapphire very thin it is expected to have minimal influence on the behavior of the total structure. The photonic band gap structure includes a hexagonal lattice of holes in a 300 nm layer of silicon nitride, on top of a sapphire substrate. This device is designed to be placed over a bulk scintillator material to improve the light extraction at angles greater than the critical angle. Sapphire and $Si_3N_4$ were chosen for the device structures, as the refractive indices of these materials closely matches that of the two scintillator materials of interest; LSYO which emits at 420 nm, and YAG:Ce which emits at 550 nm. The index of refraction of each layer is approximately 1.8, providing a close match to both types of scintillator material. For the LSYO design operating at 420 nm, the lattice constant was chosen as a=340 nm, and hole radius r=100 nm. This design was then scaled to work at 550 nm, producing a lattice constant of a=444 nm and hole size of r=130 nm.

Scintillators suitable for use in the present invention include any scintillator compositions that can be used for radiation detection. Scintillators can include, but are not limited to, cerium-doped lutetium oxyorthosilicate (LSO) scintillators, yttrium lithium silicon oxide (LYSO) scintillators, YAG:Ce scintillators, lanthanide halide scintillators, and elpasolite scintillators. In some embodiments, the scintillator compositions can be self-activated or can include a "dopant." Dopants can affect certain properties, such as physical properties (e.g., brittleness, etc.) as well as certain scintillation properties (e.g., afterglow, etc.) of the scintillator composition. The dopant can include, for example, europium (Eu), praseodymium (Pr), cerium (Ce), thallium (Tl), terbium (Tb), ytterbium (Yb), sodium (Na), samarium (Sm) and mixtures of any of the dopants. The type of scintillator used and amount of dopant present will depend on various factors, such as the application for which the scintillator composition is being used; the desired scintillation properties (e.g., emission properties, timing resolution, etc.). For example, the dopant can be included at a level in the range of about 0.1% to about 20%, by molar weight. In some embodiments, the amount of dopant is in the range of about 0.1% to about 90%, or about 0.1% to about 5.0%, or about 5.0% to about 20%, by molar weight.

The scintillators described herein can be produced in a variety of different forms, such as, e.g., a film or a crystal. Examples of the types of structures for the scintillator films described herein can include polycrystalline or crystalline forms. In certain embodiments, the scintillators described herein can be microcolumnar scintillators (e.g., in amorphous microcolumnar structure form or crystalline microcolumnar structure form). The width of the microcolumns can be tailored to a specific application. Column widths of the microcolumnar scintillators can be, e.g., greater than about 1 micron in width. In some embodiments, the columns can have widths between 1 micron and 100 microns, between 100 microns and 1 millimeter, and higher. An upper limit for the microcolumns can be a width that is the same as the thickness of the film. In some embodiments, scintillators can be produced as transparent or translucent scintillators that include a crystalline or polycrystalline layer(s). In some embodiments, scintillator films in combination with a photonic band gap structure described herein can be used to improve spatial, temporal and/or energy resolution of a radiation detection device of the present invention. In certain embodiments, scintillator films or crystals in combination with a photonic band gap structure described herein can be used to improve temporal and/or energy resolution of a radiation detection device of the present invention.

The scintillators described herein can be produced in a variety of thicknesses and spatial areas. Thicknesses of the films can be designed for certain imaging applications. For example, thin films (e.g., less than 20 μm) can be used to detect alpha particles, while limiting interference from detection of gamma rays. Thickness of the films can also be tailored to detect, for example, gamma rays, while also allowing for sufficient light transmission. In some embodiments, scintillators can be produced as a thin film, e.g., films having a thickness ranging from about 10 μm to about 1 cm. In certain embodiments, the scintillators can be thick films having a thickness of 1 cm or greater, and can be referred to as "slabs." In some embodiments, scintillators can have thickness of less than about 20 microns, less than about 500 microns, or less than about 1 cm. In certain embodiments, the scintillators can have a thickness greater than about 1 cm, greater than about 3 cm, or greater than about 5 cm. The scintillators can span over small to wide areas on the order, for example, of mm or cm² (e.g., up to 50×50 cm²).

The layer arrangements of the present invention (e.g., a nonconducting layered structure on a scintillator) can further include one or more coatings, e.g., reflective and/or protective coatings, formed on a substrate surface or otherwise coupled with a scintillator. In one embodiment, a reflective and/or protective coating can be formed on a substrate surface prior to deposition of the scintillator, such as in the case of opaque substrates. One embodiment includes the use of substrates such as alumina that are themselves white in color and act as an excellent reflector. For graphite-like substrates, reflective metal coatings can be formed. In addition to being highly reflective, such coatings may be required to withstand high process temperatures, maintain adhesion to the substrate during and after deposition, and/or be chemically inert with the scintillator or suitable for coating with a chemically inert material, such as an organic polymer or resin (e.g., Parylene C). For transparent substrates a reflective coating can be applied atop the scintillator film directly or after deposition of one or more other coatings, such as a Parylene coating. As noted above, various coating technologies can be utilized for forming coatings with desired optical and/or protective properties.

Figure 5:
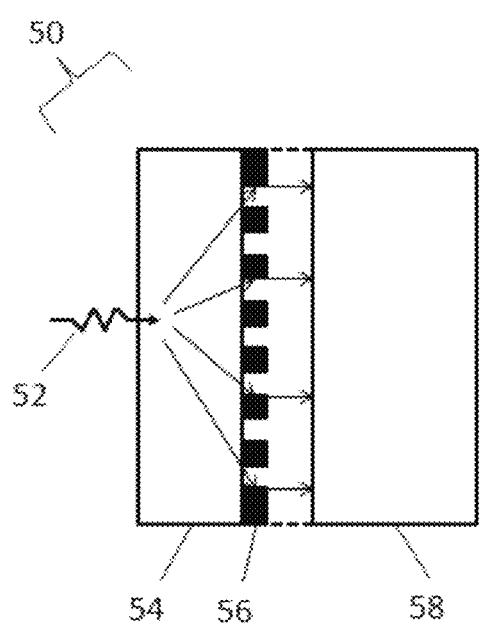
FIG. 5 shows an example radiation detection device, in accordance with an embodiment of the present invention.

As provided herein, the photonic band gap structures of the present invention can be used, e.g., to improve collection efficiency of light emitted from a scintillator. FIG. 5 illustrates a conceptual, two-dimensional light ray diagram 50 showing an example of improving light efficiency. As shown, energetic radiation (e.g., gamma rays) is irradiated onto a scintillator 54. In response to interaction with the energetic radiation, the scintillator 54 emits light at all angles, e.g., over a range of angles that are not fully collected by a photosensor 58. A nonconducting layered structure including a photonic band gap structure 56 can be coupled to the scintillator 54 to collect a wider angle of emitted light than the angle of light collected by the photosensor 58 alone. Here, the photonic band gap structure 56 is coupled directly to the scintillator 54 and the photosensor 58. The dashed lines are included to simply illustrate that the rays of emitted light from the scintillator 54 are collected by the photonic band gap structure 56 and directed to the photosensor 58 for detection.

Figure 6:
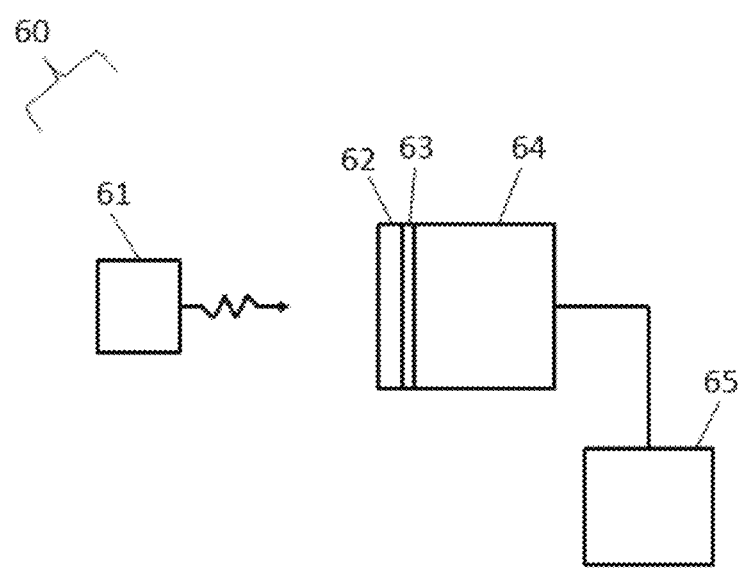
FIG. 6 depicts a conceptual, example light path diagram for directing light generated from a scintillator to a photosensor using a photonic band gap structure, in accordance with embodiments of the present invention.

A variety of detection systems and assemblies can be coupled to the photonic band gap structures of the present invention. FIG. 6 is a diagram of a detector assembly or radiation detection device of the present invention. The detection device 60 includes a scintillator 62 operably coupled to a nonconducting layered structure 63 including a photonic band gap structure. The nonconducting layered structure is coupled to a photosensor 64. The detector assembly 60 can include a data analysis, or computer, system 65 to process information from the photosensor 64. In use, the detector 60, e.g., detects energetic radiation emitted from a source 61.

The various components of the radiation detection devices can be coupled together in several ways. For example, the nonconducting layered structure including the photonic band gap structure can be operably coupled (e.g., optically coupled) to the scintillator and photosensor. In some embodiments, the nonconducting layered structure including the photonic band gap structure is directly formed (e.g., by deposition or imprinting) on the scintillator. In certain embodiments, the nonconducting layered structure including the photonic band gap structure is prepared to include a support layer and then placed in the vicinity of the scintillator (e.g., directly on the scintillator). Another embodiment of the present invention includes fabricating a dispensable tape that includes the photonic band gap structure. For example, using nanofabrication techniques (e.g., imprinting), a nonconducting layered structure including the photonic band gap structure can be made on a dispensable tape layer that can be coupled to the scintillator. In certain embodiments, one or more pieces of dispensable tape can be adhered to one or more surfaces of the scintillator. For example, one or pieces of dispensable tape can be adhered to a surface of the scintillator and then coupled to a photosensor to improve collection of light emitted from the scintillator. In some embodiments, one or pieces of tape can be adhered to other surface of the scintillator. For example, a photonic bandgap structure configured to reflect light emitted from the scintillator can be adhered to some or all of the scintillator surfaces that are not optically coupled to the photosensor. Such an embodiment, e.g., can allow for transmission of energetic radiation (e.g., gamma rays) into the scintillator and thereby generating visible light that can be reflected internally and directed towards a surface of the scintillator having a transmissive photonic bandgap structure optically coupled to the photosensor.

The structures having the photonic band gap structure (e.g., nonconducting layered structure including the photonic band gap structure) can be coupled to the photosensor in a variety of ways. In some embodiments, the nonconducting layered structure including the photonic band gap structure is coupled to the photosensor using a coupling grease, a resin (e.g., epoxy resin), a glue or other coupling material. In certain embodiments, the nonconducting layered structure including the photonic band gap structure is directly deposited on the photosensor.

A data analysis, or computer, system thereof can include, for example, a module or system to process information (e.g., radiation detection information) from the detector/photodetectors in an invention assembly and can include, for example, a wide variety of proprietary or commercially available computers, electronics, or systems having one or more processing structures, a personal computer, mainframe, or the like, with such systems often comprising data processing hardware and/or software configured to implement any one (or combination of) the method steps described herein. Any software will typically comprise machine readable code of programming instructions embodied in tangible media such as a memory, a digital or optical recording medium, optical, electrical, or wireless telemetry signals, or the like, and one or more of these structures may also be used to transmit data and information between components of the system in any of a wide variety of distributed or centralized signal processing architectures.

The detector assembly typically includes material formed from the scintillator compositions described herein (e.g., LSO or LYSO scintillators). The detector further can include, for example, a light detection assembly including one or more photodetectors or photosensors. Non-limiting examples of photosensors include photomultiplier tubes (PMT), photodiodes. PIN detectors, charge coupled device (CCD) sensors, image intensifiers, avalanche detectors and the like. Choice of a particular photodetector or photosensor will depend in part on the type of radiation detector being fabricated and on its intended use of the device. In certain embodiments, the photodetector may be position-sensitive. Detectors can further include imaging devices that can acquire images at high frame rates, such as frame rates that are faster than about 30 frames per second, about 100 frames per second, or about 1000 frames per second. The detectors may also be connected to a visualization interface, imaging equipment, or digital imaging equipment (e.g., pixilated flat panel devices).

The detector assemblies themselves, which can include the scintillator and the photodetector assembly, can be connected to a variety of tools and devices, as mentioned previously. Non-limiting examples include nuclear weapons monitoring and detection devices, well-logging tools, and imaging devices, such as nuclear medicine devices (e.g., PET). Various technologies for operably coupling or integrating a radiation detector assembly containing a scintillator to a detection device can be utilized in the present invention, including various known techniques.

The methods of the present invention further include methods of performing radiation detection. The methods of performing radiation detection can include providing a detection device including a photosensor coupled to a nonconducting layered structure having a photonic band gap structure, the nonconducting layered structure present on a surface of a scintillator; and positioning the device such that a radiation source is within a field of view of the scintillator so as to detect emissions from the source. Emissions from the source can include x-rays, gamma-rays, neutrons, alpha particles, beta particles, or a combination thereof. In certain embodiments, a material (e.g., a patient, plant, animal, object, liquid, or gas) can be positioned between the radiation source and the scintillator composition. In some embodiments, the radiation source includes a material (e.g., a patient, plant, animal, object, liquid, or gas). In another embodiment, a material of interest (e.g., a patient, plant, animal, object, liquid, or gas) may scatter energetic radiation to the scintillator. The methods of radiation detection may also include X-ray and gamma ray astronomy and cosmic ray detection (e.g., in salt mines). In certain embodiments, a material to be analyzed can be positioned between the radiation source and the scintillator. In some embodiments, the radiation source includes a patient. In some embodiments, the detector can be positioned such that the radiation source is in the field of view of the scintillator. Alternatively, the radiation source can be positioned in the field of view of the scintillator contained in the detector. Also, both the radiation source and the detector can be moved at the same time such that the radiation source is in the field of view of the scintillator.

Imaging devices, including medical imaging equipment, such as radiography, PET and SPECT (single-photon emission computed tomography) devices, and the like, represent other potential applications for the invention scintillator compositions and radiation detectors. Some other applications include radioisotope identification and/or inventory monitoring for nuclear materials. Furthermore, geological exploration devices, such as well-logging devices, were mentioned previously and represent an important application for these radiation detectors. The assembly containing the scintillator usually includes, for example, an optical window at one end of the enclosure/casing. The window permits radiation-induced scintillation light to pass out of the scintillator assembly for measurement by the photon detection assembly or light-sensing device (e.g., photomultiplier tube, etc.), which is coupled to the scintillator assembly. The light-sensing device converts the light photons emitted from the scintillator into electrical pulses that may be shaped and digitized, for example, by the associated electronics. By this general process, gamma rays can be detected, which in turn provides an analysis of geological formations, such as rock strata surrounding the drilling bore holes.

In applications of the radiation detection devices, including those set forth above (e.g., nuclear weapons monitoring and detection, imaging, and well-logging and PET technologies), certain characteristics of the scintillator are desirable, including its light output (higher is preferred), rise time (faster is preferred) and decay time (shorter is preferred), timing shape (e.g., fixed or varying, depending upon dopant concentration used to analyze scintillation events), energy resolution (finer/lower % is preferred), spatial resolution (finer, e.g., higher, is preferred), and suitable physical properties. The present invention is expected to provide detection devices which can provide the desired high light output and initial photon intensity characteristics for demanding applications of the technologies. Furthermore, the scintillator materials are also expected to be produced efficiently and economically, and also expected to be employed in a variety of other devices which require radiation/signal detection (e.g., gamma-ray, X-ray, neutron emissions, and the like).

The present invention further includes methods of making a photonic band gap structure formed on a scintillator. Forming a nonconductive layered structure can be done using a variety of methods. For example, suitable deposition methods can include, but are not limited to, vapor deposition, chemical vapor deposition, physical vapor deposition, hot wall evaporation, and electron beam evaporation. Scintillators can be made using. e.g., techniques generally well known in the art. As will be described further below, methods of making the photonic band gap structures can include electron beam lithography and other nanofabrication techniques.

In certain aspects, the present invention includes a method of making a photonic band gap structure formed on a scintillator. The method can include forming a dielectric layer on a scintillator, wherein the dielectric layer is formed directly on the scintillator or on a transparent dielectric support layer on the scintillator; and removing regions of the dielectric layer to form a photonic band gap structure on the scintillator.

Figure 7:
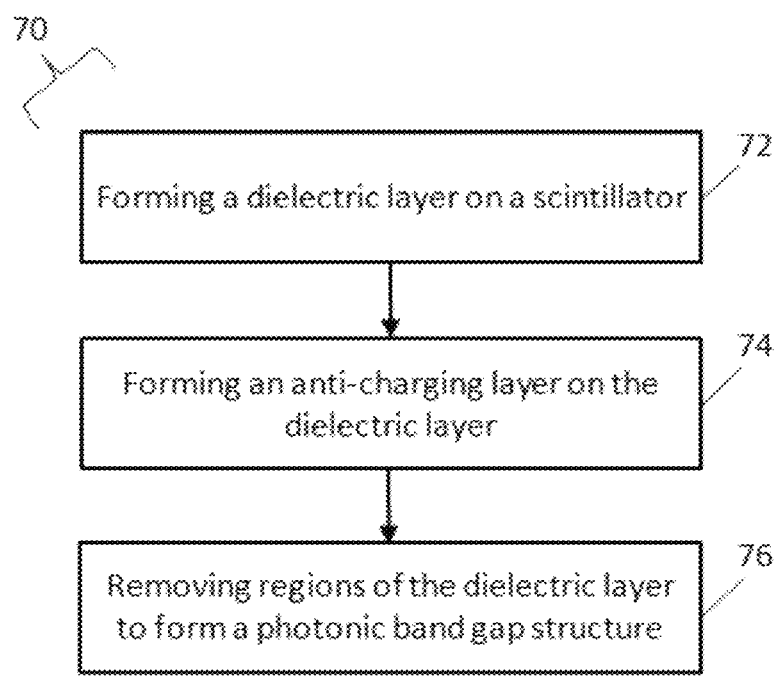
FIG. 7 provides an example method of making a photonic band gap structure, in accordance with an embodiment of the present invention.

In some embodiments, the methods can include forming an anti-charging layer (e.g., a conductive photoresist layer) on a dielectric layer (e.g., silicon nitride). FIG. 7 provides an example method 70 using an anti-charging layer to make a photonic band gap structure (or photonic crystal). The method 70 includes forming a dielectric layer on a scintillator (Step 72), forming an anti-charging layer on the dielectric layer (Step 74), and removing regions of the dielectric layer to form a photonic band gap structure on the scintillator (Step 76). Suitable anti-charging layers include, but are not limited to, a conductive photoresist layers or a metal layer. Multiple layers can be used. Suitable conductive photoresist layers can include, but are not limited to, Espacer 300Z (Showa Denko America). Suitable metal layers can include, but are not limited to, gold or nickel. The anti-charging layers can be between 1 nm to 1000 nm in thickness. Removing regions of the photonic crystal layer can include etching a pattern in the dielectric layer with radiation, thereby forming the photonic band gap structure on the scintillator. Radiation can include electron beam radiation, ultraviolet light or a combination thereof. One aspect of the present invention relates to the discovery that an anti-charging layer (e.g., a conductive photoresist layer) can be formed on a dielectric layer (e.g., a nonconducting layered structure) to allow for direct fabrication of a photonic band gap structure on the surface of a scintillator. It is noted that use of some types of radiation (e.g., electron beam radiation) can generate electrons and/or charges in the dielectric layer, thereby causing problems with fabrication of the photonic band gap structures (e.g., poor structural formations). Application of an anti-charging layer can be used advantageously to improve fabrication of the photonic crystals, as well as allowing for direct deposition on a scintillator surface or other nonconductive material. In addition, an anti-charging layer can be used to allow for making large area photonic band gap structures (e.g., greater than 1 square millimeter coverage over a scintillator surface), as further described herein.

In certain embodiments, the methods can include removing regions of the photonic crystal layer by contacting the photonic crystal layer with a contact printing stamp to form a patterned layer on the photonic crystal layer and removing a remainder of the photonic crystal layer uncovered by the patterned layer, thereby forming the photonic band gap structure on the scintillator.

In some embodiments, removing regions of the photonic crystal layer can include imprinting the photonic crystal layer with a hard stamp to form a plurality of imprinted regions in a polymer layer on photonic crystal layer, and removing the plurality of imprinted regions in the photonic crystal layer, thereby forming the photonic band gap structure on the scintillator.

Figure 8:
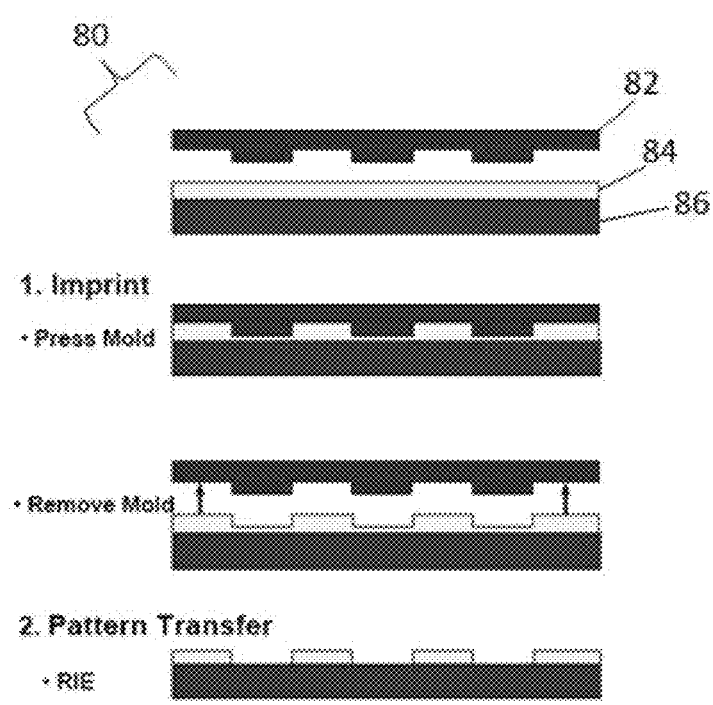
FIG. 8 illustrates an example imprinting method of making a photonic band gap structure, in accordance with an embodiment of the present invention.

FIG. 8 shows an example method 80 for using hard nanoimprint lithography (HNIL) for making photonic band gap structures. To fabricate a photonic band gap structure, a patterned mold 82 (e.g., silicon) can be used to imprint a pattern in a polymer layer 84 formed on a scintillator 86. The patterned mold 82 can be pressed against the polymer layer 84 to imprint the pattern. The mold 82 can be removed and then the pattern can be transferred to the scintillator 86 surface using, e.g., reactive ion etching.

Soft lithography can also be used to make the photonic band gap structures. Soft lithography involves an elastomeric stamp/mold process in which the inverse of the elastomer stamp is first made by a conventional optical or electron beam writing process and then the elastomer is poured over this structure. The replication of the "master-pattern" is then performed using the PDMS stamp. For this stage the stamp can be inked with various molecules (thiols, thioethers, alkoxysilanes, chlorosilanes, etc.) Contact between the stamp and the substrate surface is then made in order to deposit monolayer formations of the materials at the regions of contact. It should be noted that there are various derivatives of soft lithography and included under this umbrella title are the technologies of micro-contact printing (μCP), replica molding (REM), micro-transfer molding (μTM), micro-molding in capillaries (MIMIC), solvent-assisted micro-molding (SAMIM) and patterning by etching at nanoscale (PENs).

In certain embodiments, large area photonic band gap structures can be formed using imprinting techniques (e.g., hard and soft imprinting lithography) that involve patterning the photonic crystals on the surface of the scintillator or other layer in a sequential fashion, e.g., by imprinting one area and then imprinting an adjacent area.

In some aspects, the present invention includes a method of making a photonic band gap structure formed on a tape material that can be placed on a scintillator. The method can include forming a dielectric layer on a tape material, wherein the dielectric layer is formed directly on the tape material or on a nonconducting, transparent dielectric support layer on the tape material; removing regions of the dielectric layer to form a photonic band gap structure on the dispensable; and adhering the tape material to a scintillator. The methods of making the photonic band gap structure are similar to those described above. In this embodiment, the photonic band gap structure is fabricated on a tape material (e.g., a dispensable tape) that can be applied to one or more surfaces of a scintillator as described further herein. Suitable tape materials include virtually any adhesive material that can adhere to a scintillator and allow for desired optical properties (e.g., transparency and/or matching of indices of refraction). Example tape materials can include, but are not limited to, polyimide, KAPTON™, or any vinyl materials, such as polyvinyl sheets or stripes.

It is understood that the examples and embodiments described herein are for illustrative purposes only and that various modifications or changes in light thereof will be suggested to persons skilled in the art and are to be included within the spirit and purview of this application and scope of the appended claims. Numerous different combinations, including combinations of embodiments described herein, are possible, and such combinations are considered part of the present invention.

EXAMPLES

Example 1

This example describes a fabrication process for PC scintillator device structures on sapphire. To perform electron beam patterning, CAD files for two different spacing/radius combination devices were created. First a small, 500×500 μm² device was chosen. Using DesignWorks software, CAD pattern files were created in .DXF format. These files were then input into LayoutBeamer, a proximity correction program that converts the files into .v30 files that could be read by the JEOL JBX-9300FS e-beam lithography system. Once the files were converted and transferred to the system, the job deck and scheduler files were created to set the pattern location and doses on the sapphire piece.

A 300 nm $Si_3N_4$ coated substrate was used for the PC device pattern studies and broken in half to provide two substrates for dose testing purposes. Since the pattern consists of holes, a positive resist of ZEP520 was used to reduce the electron beam area write time. Based on the expected resist selectivity during the dry etch process, it was determined that a 500 nm thickness of resist should be enough for a 300 nm $Si_3N_4$ etch. The resist was spun onto the piece according to the standard process parameters. Following the resist spinning, a layer of conductive resist called ESpacer was applied to the substrate to provide an anti-charging layer for the e-beam writing. A conductive resist layer was applied before placing the wafer into the e-beam system.

Figure 9A:
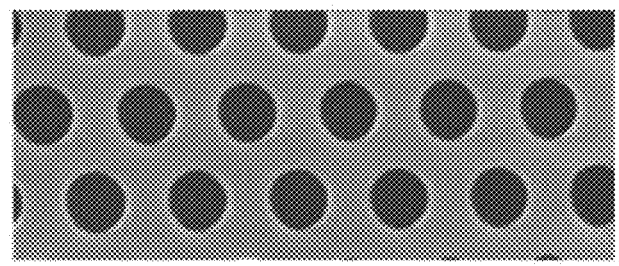
FIG. 9A shows a scanning electron micrograph of a photonic band gap structure.
Figure 9B:
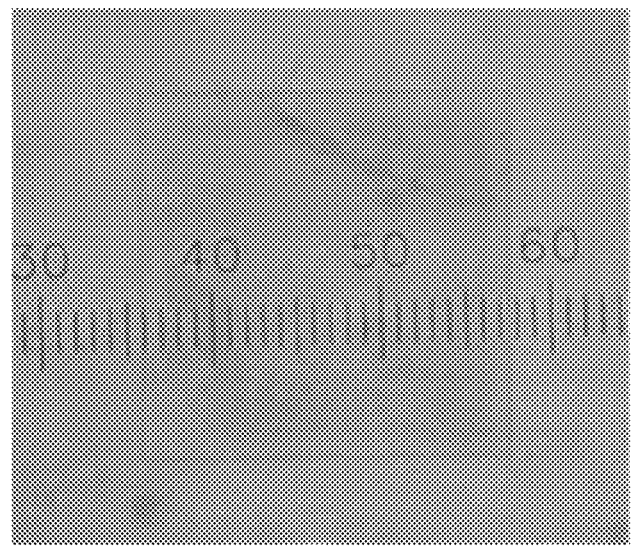
FIG. 9B shows an image of a 2×2 $mm^2$ photonic band gap structure, in accordance with embodiments of the present invention.

Once the resist layers were applied, the wafer piece was placed in the piece cassette holder of the e-beam system and loaded for writing. Several iterations were carried out to find the device dose that would create patterns that most closely matched the original CAD file. The ESpacer conductive resist was removed prior to the development of the ZEP520 pattern. FIG. 9A shows the etched test PC device in silicon. After analyzing the results from the $Si_3N_4$ over Si test devices, a process and write dose was obtained. Using these parameters, two 2>2 mm² devices were patterned, one using r=100 nm, a=340 nm, and one using the modified YAG longer wavelength design spacing of r=130 nm, a=444 nm. FIG. 9B shows a photograph of a 2×2 mm² photonic crystal.

The device was etched by performing a plasma etch to transfer the final pattern into the $Si_3N_4$ layer. The substrate carrying the $Si_3N_4$ layer was first coated with CoolGrease on the back for thermal conductivity and placed on an oxidized Si carrier wafer for loading into the etcher system. The STS SOE was used as the plasma etch tool. For the selectivity between ZEP e-beam photoresist and the $Si_3N_4$ etch, the values are approximately 130 nm/min for $Si_3N_4$ vs. 180 nm/min for ZEP. To etch through 300 nm of $Si_3N_4$, the etch time was 2 minutes 30 seconds. This resulted in a complete etch through the $Si_3N_4$ while leaving approximately 500 nm–415 nm=85 nm of ZEP on the substrate. After the etch, the ZEP was removed by a two minute soak in a 1165 room temperature resist stripper solution. This process was applied to device sizes of 1×1 $mm^2$, and 2×2 $mm^2$, which increased the device e-beam write time to about 1-4 hours per device, based on the resist dose.

Example 2

This example describes characterization of optical properties of PCs ranging in size from 500×500 $\mu m^2$ to 2×2 $mm^2$. These characterized bi-layer PBG structures were integrated with LYSO scintillators and the optical and scintillation performance of the PBG/LYSO assemblies were evaluated.

The PC/LYSO modules were tested using a $^{137}Cs$ (662 keV) γ-source. The spectra were acquired using a Photonics XP2203 PMT, an ORTEC 113 preamplifier, a Canberra 2021 spectroscopy amplifier, and an Amptek 8000A pocket MCA. The amplifier shaping time was 250 ns (gain of 30). PCs were fabricated over 0.5×0.5 $mm^2$, 1×1 $mm^2$, and 2×2 $mm^2$ areas in a silicon nitride layer deposited over sapphire substrates. Pieces of LYSO ranging in size from 1×1×10 $mm^3$ to 2×2×20 $mm^3$ were used with these photonic crystals for these experiments. The responses of the LYSO/PC modules for various sizes of the PC arrays and various pieces of LYSO were compared to determine the gain in light collection efficiency resulting from the PC structure.

Figure 10:
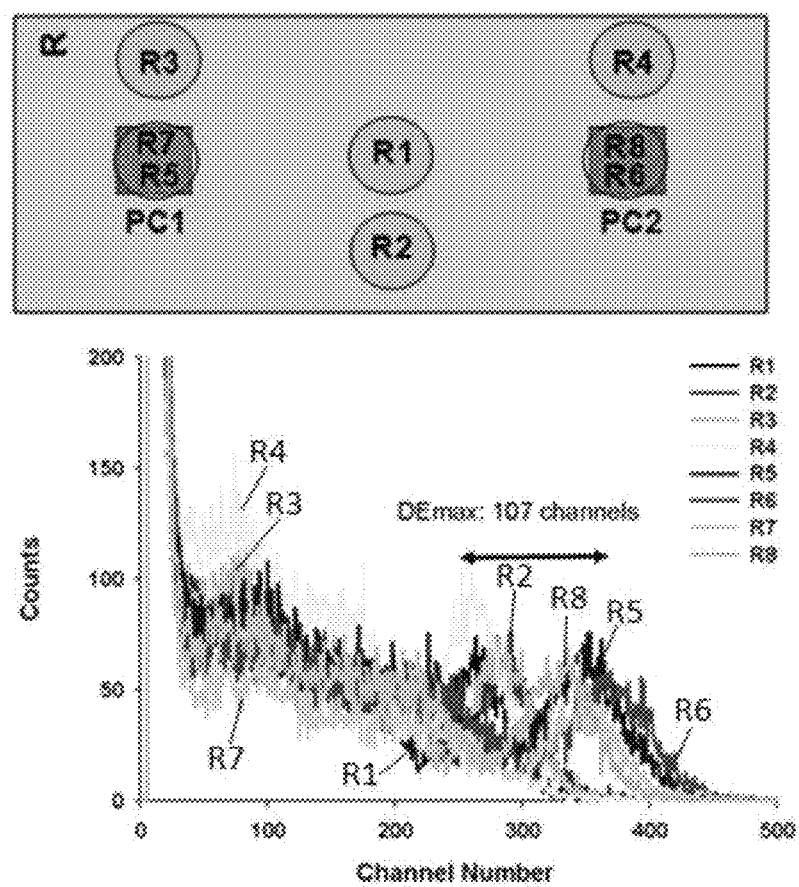
FIG. 10 shows positions of measurement on a photonic band gap structure (top) and spectra for the positions of measurements (bottom), in accordance with embodiments of the present invention.

The results showed that a PC applied to the surface of an LYSO crystal increases detected light output (e.g., a 35% improvement in light output), that the application of a PC to any fraction of an LYSO surface increased light output, and that light output increased linearly and monotonically with the percentage of area covered. The spectra using $^{137}Cs$ for a series of eight measurements is shown in FIG. 9. For these measurements, a 2×2×2 $mm^3$ LYSO crystal was coupled first to the 1×1 $mm^2$ photonic crystal, then to the background silicon nitride layer, and the spectra were acquired for 2 minutes. The location of these measurements is shown in FIG. 10 (Top). The rectangular region is the silicon nitride layer, and R1 to R8 are the measurement locations. Out of these eight locations, R1-R4 are on the silicon nitride and R5-R8 are on the photonic crystals (PC). R5 and R7 are on PC1 (the PC on the left), and R6 and R8 are on PC2 (the PC on the right). The spectra are shown in FIG. 10 (Bottom), where the channel number is plotted on the X-axis and the counts on the Y-axis. Measurements at R1-R4 represent the $Si_3N_4$ background without the PC, whereas R5-R8 represents the gain in light yield due to the PC/LYSO structure. Measurements R5, R6, R7 and R8 all exhibit a higher light output, as indicated by the right shift in peak position by 107 channels, which represents an increase of ~35% in the light collection due to the photonic crystals.

Similar improvements were also observed when the same 2×2×20 $mm^3$ LYSO piece was used with the 0.5×0.5 $mm^2$ PC. In this case, the right shift in peak position by 80 channels (representing enhancement in light extraction) is lower than that shown in FIG. 9 because in this case, only 25% of the LYSO exit surface was covered by the smaller size PCs.

Figure 11:
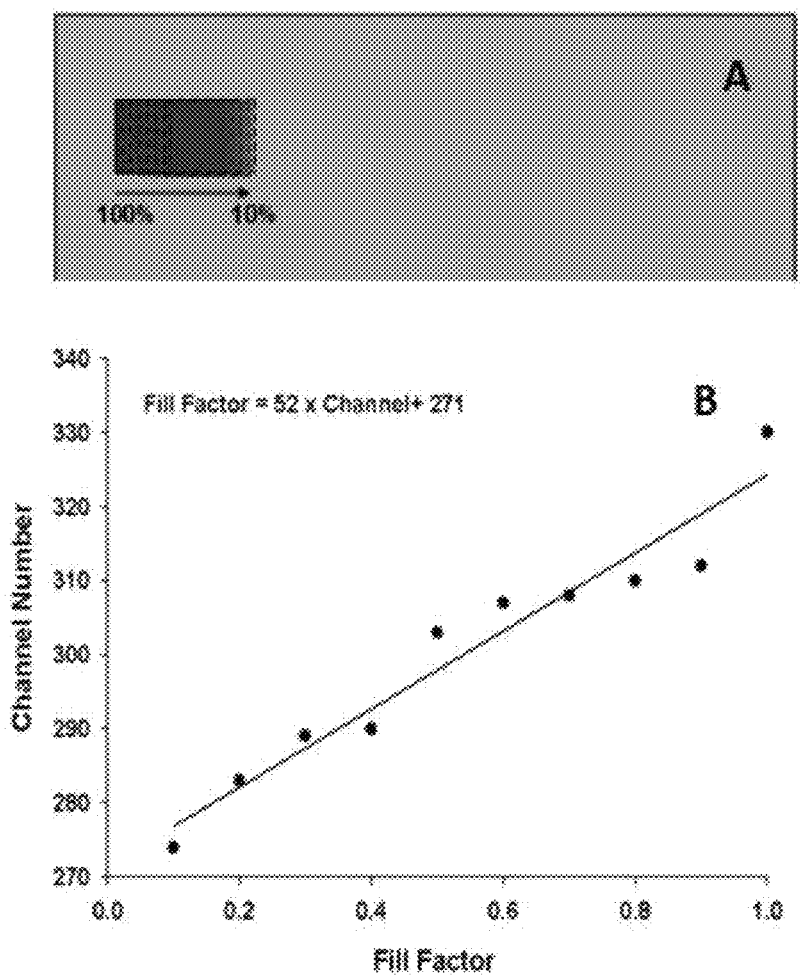
FIG. 11A depicts a position of measurement in relation to a photonic band gap structure in a silicon nitride layer.
FIG. 11B shows relative intensity of light emitted from a scintillator at the positions of measurement in relation to the photonic band gap structure, in accordance with embodiments of the present invention.

Other experiments included using a translation stage to scan a 1×1×20 $mm^3$ LYSO piece over the 1×1 $mm^2$ PC and study the change in light output as a function of the LYSO surface coverage with the PC. As shown in FIG. 11B, when the LYSO and the PC are exactly overlapping (e.g. 100%), the highest light output was observed. As the LYSO was translated across the PC (FIG. 11A), the percentage overlap (from e.g., 100% to 10%) between the LYSO and the PC decreased, resulting in decreased light output in the PMT. As shown in FIG. 11B, there is a linear variation in the detected light as the overlap between the LYSO and the PC varies.

Example 3

This example describes using nanofabrication techniques that can be readily scaled up to produce large area photonic band gap structures. Nanoimprinting lithography will be used to fabricate photonic crystal devices over areas ranging from 1×1 cm2 to 3×5 $cm^2$ on suitable substrates. Such large area PCs could be readily integrated in clinical PET systems to provide significant improvements in image quality but with greatly reduced patient dose.

The PC designs will be fabricated on smaller coupons over 3×3 $mm^2$ to 5×5 $mm^2$ in area, for optical and radiation characterization. These structures will be fabricated in $Si_3N_4$ layers deposited on the scintillator or refractive index matching substrate and also on YAG:Ce for optical characterization. The use of YAG:Ce which has a broad spectra will be used, e.g., to determine both the directional and spectral properties of the scintillation emission. Typically, a PC has a specific and narrow linewidth that can be strongly dependent on its physical properties and dimensions. Thus, a broad scintillation response will provide the spectral coverage necessary to ensure a detailed characterization of prototype structure(s). Additionally, the scintillation from most materials although fairly narrow, is typically ~100 nm, which is expected to be broader than the anticipated PC response curve.

For large area PC fabrication, hard imprinting technique will be used over large areas. The mechanical strength of scintillator materials is sufficiently strong and robust to withstand this process. Stamps will be made in Si or $SiO_2$ or nickel. Stamps for 3×3 $mm^2$ and 5×5 $m^2$ areas will be fabricated. Larger stamps up to 1×1 $cm^2$ in size will be made and used for imprinting 1×1 $cm^2$ and 3×5 $cm^2$ areas. Coverage of the large area scintillators will be accomplished by tiling to an alignment accuracy of <500 nm to produce an effective surface coverage of 99%.

Steps for fabricating imprint stamps in $SiO_2$/Quartz can include the following: 1. Coat SiO2/quartz with 50 nm Cr film by e-beam evaporation; 2. Coat EBL resist and pattern by EBL; 3. Plasma etch Cr layer to transfer EBL pattern into Cr layer; 4. Strip EBL resist; 5. Plasma etch $SiO_2$ using Cr layer as a "hard" mask. Cr can provide a better etch selectivity. The etch selectivity of $SiO_2$ to Cr is >30 to 1, whereas that of $SiO_2$ to ZEP520 EBL resist is ~1.5 to 1; 6. Strip Cr with Cr removal wet etch (e.g., perchloric acid).

Steps for fabricating a Ni nanostructured stamp can include the following: 1. Make a silicon mold using standard e-beam writing and RIE; 2. Pour/apply a polymer film to make an inverse replica; 3. Sputter a thin film of Ni onto the polymer replica; 4. Electro plate Ni onto the polymer replica to a thickness of hundreds of micrometers; 5. Remove polymer. This results in a Ni copy of the Si mold in step 1.

An alternative way to make it is to direct write patterns in resist on a Ni substrate, and transfer the pattern by plasma etching Ni using the EBL resist pattern as a mask. An example stamp will be fabricated, where the pattern consists of 200 nm diameter holes on a 300 nm pitch that were etched to a depth of 500 am covering over 1.8×1.8 $cm^2$ area.

What is claimed is:

1. A radiation detection device, comprising:
a photosensor coupled to a nonconducting structure comprising a photonic band gap structure, the nonconducting structure present on a surface of a scintillator selected from the group consisting of a cerium-doped lutetium oxyorthosilicate (LSO) scintillator, a cerium-doped lutetium yttrium oxyorthosilicate (LYSO:Ce) scintillator, a YAG:Ce scintillator, a lanthanide halide scintillator, and an elpasolite scintillator, wherein the photonic band gap structure comprises a patterned polymeric material with periodic posts or holes and is formed over an area of the scintillator greater than about 1 square millimeter;
wherein the photonic band gap structure comprises a band gap that matches an emission wavelength of the scintillator, wherein the emission wavelength of the scintillator ranges between 350 nm to 1100 nm; and
wherein the device is configured to detect gamma rays, x-rays, neutrons, or a combination thereof.

2. The device of claim 1, wherein the nonconducting structure is a single layer comprising the photonic band gap structure.

3. The device of claim 1, wherein the nonconducting structure includes a plurality of layers.

4. The device of claim 3, wherein a first layer in the plurality comprises the photonic band gap structure and a second layer in the plurality comprises a transparent dielectric support layer between the photonic band gap structure and the surface of a scintillator.

5. The device of claim 4, wherein the transparent dielectric support layer comprises sapphire having the formula $Al_2O_3$.

6. The device of claim 1, wherein the nonconducting structure comprises a film formed directly on the surface of the scintillator.

7. The device of claim 6, wherein the nonconducting structure is directly deposited on the surface of the scintillator.

8. The device of claim 1, wherein the posts or holes are arranged in a triangular, square or hexagonal periodicity.

9. The device of claim 1, wherein the photonic band gap structure is formed over an area of the scintillator greater than about 9 square millimeters.

10. The device of claim 1, wherein the photonic band gap structure is formed over an area of the scintillator between about 1 square millimeter and 9 square millimeters.

11. The device of claim 1, further comprising a photosensor coupled to the photonic band gap structure on the scintillator.

12. The device of claim 1, wherein the photonic band gap structure is attached to a tape material.

13. The device of claim 12, wherein the tape material is selected from the group consisting of polyimide, polyvinyl sheets, polyvinyl stripes, and a vinyl material.

14. The device of claim 11, wherein the photosensor is coupled to the photonic band gap structure with a coupling material that is selected from the group consisting of a coupling grease, a resin, and a glue.

15. The device of claim 11, wherein the photonic band gap structure is directly deposited on the photosensor.

* * * * *